United States Patent
Yan

(10) Patent No.: US 8,352,668 B2
(45) Date of Patent: *Jan. 8, 2013

(54) USB SHARING SWITCH WITH AUTOMATIC SWITCHING CAPABILITIES

(75) Inventor: Xiong Yan, Richmond (CA)

(73) Assignee: Aten International Co., Ltd., Shijr (TW)

(*) Notice: Subject to any disclaimer, the term of this patent is extended or adjusted under 35 U.S.C. 154(b) by 0 days.

This patent is subject to a terminal disclaimer.

(21) Appl. No.: 12/981,402

(22) Filed: Dec. 29, 2010

(65) Prior Publication Data

US 2011/0093641 A1   Apr. 21, 2011

Related U.S. Application Data

(63) Continuation of application No. 12/268,974, filed on Nov. 11, 2008, now Pat. No. 7,886,106.

(51) Int. Cl.
*G06F 13/00*   (2006.01)

(52) U.S. Cl. .................... 710/316; 710/317; 710/38

(58) Field of Classification Search .............. 710/15, 710/17, 18, 38, 39, 52, 300, 105, 110, 305, 710/310, 313, 314, 316, 317
See application file for complete search history.

(56) References Cited

U.S. PATENT DOCUMENTS

| | | | |
|---|---|---|---|
| 5,280,585 A | 1/1994 | Kochis et al. | |
| 5,638,521 A | 6/1997 | Buchala et al. | |
| 6,532,512 B1 | 3/2003 | Torii et al. | |
| 6,546,450 B1 | 4/2003 | Liu | |
| 6,600,739 B1 | 7/2003 | Evans et al. | |
| 6,934,793 B2 | 8/2005 | Ying et al. | |
| 7,127,546 B2 | 10/2006 | Ying et al. | |
| 7,340,556 B2 | 3/2008 | Lou et al. | |
| 7,502,878 B1 * | 3/2009 | Wright | 710/37 |
| 2001/0032280 A1 | 10/2001 | Osakada et al. | |
| 2004/0075638 A1 | 4/2004 | Han | |
| 2004/0186943 A1 | 9/2004 | Lou et al. | |

(Continued)

FOREIGN PATENT DOCUMENTS

CN   1602473 A   3/2005

(Continued)

OTHER PUBLICATIONS

Chinese Office Action, dated Mar. 2, 2011, in a counterpart Chinese patent application, No. CN 200910138038.4.

(Continued)

*Primary Examiner* — Khanh Dang
(74) *Attorney, Agent, or Firm* — Chen Yoshimura LLP

(57) ABSTRACT

A USB printer sharing switch device with automatic switching capabilities is provided for multiple computers to share a USB printer. The sharing switch device transfers USB data between the computers and the printer without changing the data format. The automatic switching function is performed by hardware and firmware of the sharing switch device in cooperation with driver software on the computers. In one implementation, the sharing switch device includes multiple USB device controllers corresponding to the multiple computers, and employs multiple switches and a USB hub so that each computer is connected to its corresponding controller and the computer that is currently connected to the printer can communicate with its controller while printing. The current computer transmits a spooling finished command to its controller when spooling is finished. After receiving the spooling finished command, the sharing switch device automatically switches the printer to another computer.

6 Claims, 5 Drawing Sheets

U.S. PATENT DOCUMENTS

| | | |
|---|---|---|
| 2004/0268012 A1 | 12/2004 | Ferguson |
| 2005/0216620 A1 | 9/2005 | Sandulescu et al. |
| 2005/0283563 A1 | 12/2005 | Lou et al. |
| 2006/0123182 A1* | 6/2006 | Sandulescu et al. .......... 710/316 |
| 2007/0245058 A1 | 10/2007 | Wurzburg et al. |
| 2007/0255869 A1 | 11/2007 | Walters et al. |
| 2009/0106474 A1 | 4/2009 | Bohm et al. |
| 2009/0106477 A1 | 4/2009 | Lou et al. |
| 2009/0204742 A1* | 8/2009 | Wiler ............................ 710/316 |
| 2009/0210608 A1* | 8/2009 | Chang et al. .................. 710/316 |
| 2009/0254682 A1 | 10/2009 | Tseng et al. |
| 2009/0257089 A1 | 10/2009 | Cheng |
| 2010/0077089 A1 | 3/2010 | Konishi et al. |
| 2010/0077126 A1 | 3/2010 | Huang et al. |

FOREIGN PATENT DOCUMENTS

| | | |
|---|---|---|
| CN | 101004721 A | 7/2007 |
| GB | 2352540 | 1/2001 |
| TW | 200825839 A | 6/2008 |

OTHER PUBLICATIONS

Taiwanese Office Action, dated Jul. 25, 2012, in a counterpart Taiwanese patent application, No. 098107683.

* cited by examiner

USB SHARING SWITCH WITH AUTOMATIC SWITCHING CAPABILITIES

This application is a continuation application under 35 USC §120 of U.S. Application Ser. No. 12/268,974, filed Nov. 11, 2008, allowed, which is herein incorporated by reference in its entirety.

BACKGROUND OF THE INVENTION

1. Field of the Invention

This invention relates to a USB sharing switch device, and in particular, it relates to a USB sharing switch device which has automatic switching capabilities.

2. Description of the Related Art

A sharing switch device is a device that connects multiple computers to one or more peripheral devices such as printers, scanners, storage devices, etc., which allows the computers to share the peripheral devices. The sharing switch device selectively connects one of the computers to a peripheral device. A USB sharing switch device uses the USB (Universal Serial Bus) protocol for communication between the computers and the peripheral devices. In a conventional USB sharing switch device, switching is done manually by either pressing a button on the sharing switch device or sending a command from the computer to the sharing switch device. The USB sharing switch device is connected to both the computers and the peripheral device by USB cables, and data in the USB format is transferred through the sharing switch device without changing their format.

Another type of devices for sharing a printer by multiple computers is a printer server. Typically, the computers are connected to the printer server via a network such as Ethernet, and the printer server is connected to the printer by a cable such as a USB cable. The printer server processes packet data received from the computers over the network and transform it into USB data for the printer.

SUMMARY OF THE INVENTION

The present invention is directed to a USB sharing switch device and related method that substantially obviate one or more of the problems due to limitations and disadvantages of the related art.

An object of the present invention is to provide a USB sharing switch device for printers which has automatic switching capabilities.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a sharing switch device for coupling to a peripheral device and a plurality of computers, which includes: a plurality of computer-side switches each for coupling to a corresponding computer; a hub device having an upstream end coupled to the plurality of computer-side switches, a first downstream end for coupling to the peripheral device, and a second downstream end; a plurality of controllers each coupled to a corresponding computer-side switch, wherein each computer-side switch switches the corresponding computer to either the corresponding controller or the upstream end of the hub device; and a controller-side switch coupled to the plurality of controllers and to the second downstream end of the hub device for switching the second downstream end of the hub device to one of the controllers.

Specifically, the controllers control the switching of the computer-side switches and the controller-side switch to switch one of the computer-side switches corresponding to a selected one of the computers to the hub device, switch the other computer-side switches to their corresponding controllers, and switch the controller-side switch to the controller corresponding to the selected computer, whereby the selected computer is connected to the peripheral device via the corresponding computer-side switch and the hub device.

Further, a master controller of the sharing switch maintains a queue of switching requests received from the computers, and when the master controller receives a data transfer finished command from a computer, it retrieves a next switching request from the queue and initiates switching of the computer-side switches and the controller-side switch to connect a next computer to the peripheral device.

In another aspect, the present invention provides a sharing switch device for coupling to a peripheral device and a plurality of computers, which includes: a plurality of N computer-side switches each for coupling to a corresponding computer; a common connection line for coupling to the peripheral device, the common connection line being coupled to the N computer-side switches; a busy detection circuit coupled to the common connection line for detecting a busy condition of the common connection line and generating signals representing a detection result; a plurality of N-1 controllers; and a plurality of controller-side switches coupled to the N-1 controllers and to the N computer-side switches for switching any combination of N-1 out of the N computer-side switches to the N-1 controllers, wherein each computer-side switch switches the corresponding computer to either the common connection line or to one or more of the controller-side switches.

Specifically, the controllers control the switching of the computer-side switches and the controller-side switches to switch the computer-side switch corresponding to a selected computer to the common connection line, switch the other N-1 computer-side switches to the controller-side switches, and switch the controller-side switches to connect the other N-1 computer-side switches to the N-1 controllers, whereby the selected computer is connected to the peripheral device.

Further, a master controller of the sharing switch maintains a queue of switching requests received from the computers, the busy detection circuit transmits the signals representing the detection result to the master controller, and the master controller determines whether data transfer is finished based on the signals from the busy detection circuit; when it determines that data transfer is finished, the master controller retrieves a next switching request from the queue and initiates switching of the computer-side switches and the controller-side switches to connect a next computer to the peripheral device.

In another aspect, the present invention provides a method implemented in a peripheral device sharing system including a sharing switch device and a peripheral device and a plurality of computers coupled to the sharing switch device, where the method includes, on the sharing switch device: (a) connecting a currently selected computer to the peripheral device; (b) receiving switching requests from the plurality of computers; (c) placing the switching requests in a queue; (d) determining whether the data transfer between the currently selected computer and the peripheral device has finished; and (e) if it is determined that the currently selected computer has finished transferring data, retrieving a next switching request from the queue and connecting a next selected computer to the peripheral device based on the next switching request.

The method further includes, on each computer: (f) automatically transmitting a switching request to the sharing switch device when a program on the computer requests a data transfer to or from the peripheral device; (g) monitoring a connected status for the peripheral device; and (h) after determining that the peripheral device is connected, transferring data to or from the peripheral device.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

The present invention provides a USB printer sharing switch device with automatic switching capabilities, which allows multiple computers to conveniently share a USB printer. Both the computers and the printer are connected to the sharing switch device by USB cables. Preferably, the sharing switch device transfers data in the USB format without changing it from one format to another. The automatic switching function is performed by hardware and firmware of the sharing switch device in cooperation with driver software on the connected computers.

Figure 1:
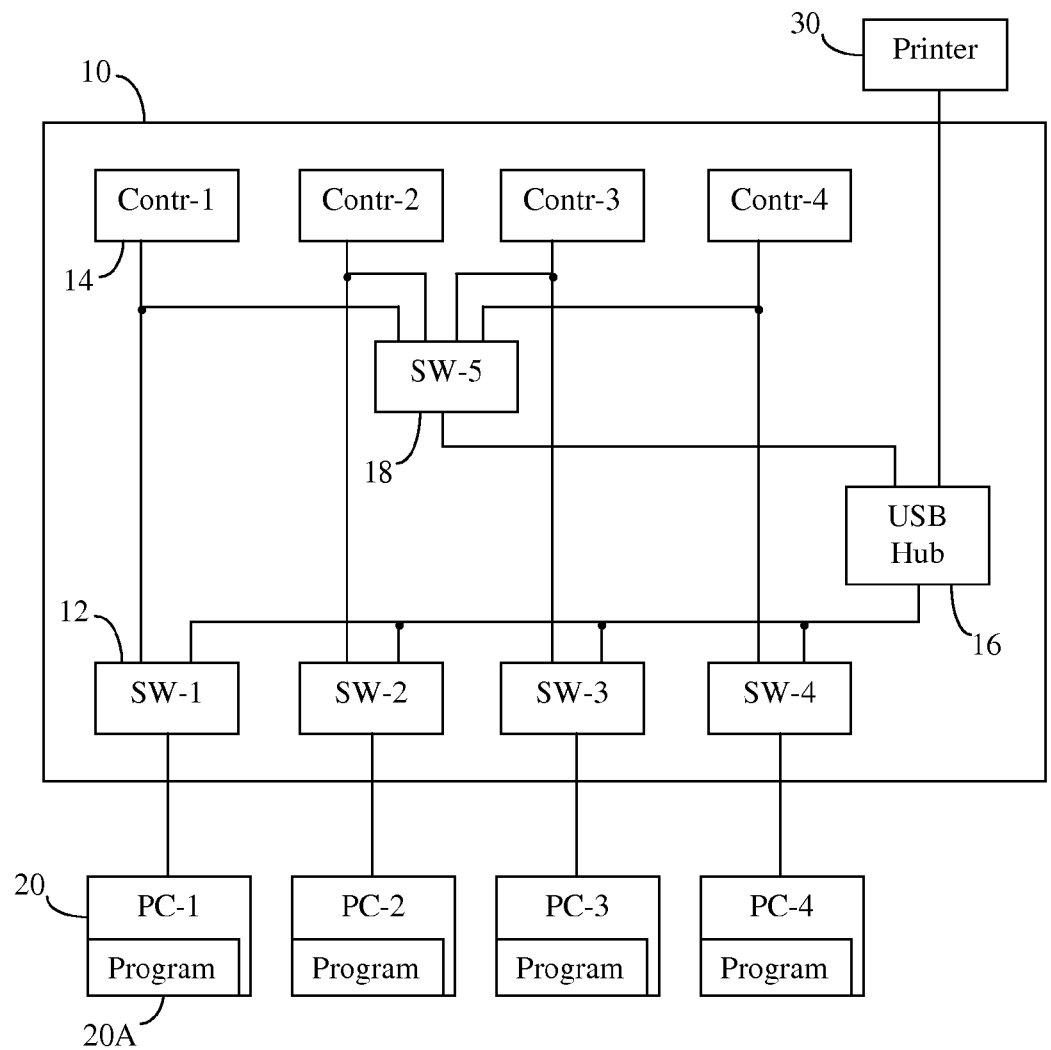
FIG. 1 is a block diagram of a system including a sharing switch device according to a first embodiment of the present invention.

FIG. 1 illustrates a printer sharing system including a sharing switch device according to a first embodiment of the present invention. As shown in FIG. 1, the sharing switch device 10 is coupled to a printer 30 and a plurality of computers 20. Four computers 20 (PC-1 to PC-4) are shown in this example. The sharing switch device 10 includes a plurality of computer-side switches 12 each coupled to a corresponding computer 20 and a plurality of USB device controllers 14 each coupled to a corresponding computer-side switch 12. Four computer-side switches 12 (SW-1 to SW-4) and four USB device controllers 14 (Contr-1 to Contr-4) are shown in this example, corresponding to the four computers (PC-1 to PC-4). Each computer-side switch 14 is also coupled to an upstream port of a common USB hub 16, such that the computer-side switch 14 switches the corresponding computer 20 to either the common USB hub 16 or the corresponding controller 14. The sharing switch device 10 additionally includes a controller-side switch 18 which is coupled at one side to a first downstream port of the USB hub 16 and at the other side to each of the controllers 14, such that the switch 18 switches the USB hub 16 to one of the controllers 14. The printer 30 is coupled to a second downstream port of the USB hub 16.

The USB device controllers 14 may be low speed device controllers. In one implementation, they are USB HID Class (Human Interface Device) device controllers, and the computers 20 use their default HID driver to interact with the controllers 14. The plurality of controllers 14 are coupled together and communicate with each other using a master-slave model, such that one of the controllers is a master and the others are slaves. The connection lines among the controllers 14 are not shown in FIG. 1 to avoid overcrowding. One or more of the controllers 14 are programmed to control the switching operation of the computer-side switches 12 and the controller-side switch 18. In principle, one of the USB device controllers 14, such as the master controller, can control the switching operation of all of the switches 12 and 18. In actual implementation, however, the number of switches that can be controlled by one controller 14 may be limited due to the limited number of pins on the controller, especially when relatively inexpensive USB device controller chips are used. Therefore, the master controller and one or more slave controllers 14 may cooperate to perform the functions of controlling the switches 12 and 18. In this respect, when the disclosure or the claims refer to the "device controllers" controlling the switching of the switches, it should be understood that this does not mean all device controllers must be involved. The control signals are transmitted between the controllers 14 and the switches 12 and 18 they control via desiccated control lines, which are not shown in FIG. 1 to avoid overcrowding.

Each computer 20 is loaded with a special USB port monitor program 20A, which cooperates with the spooler service of the computer 20 and with the sharing switch device 10 to accomplish spooling of print data to the shared printer 30, as will be described in more detail later.

Figure 2:
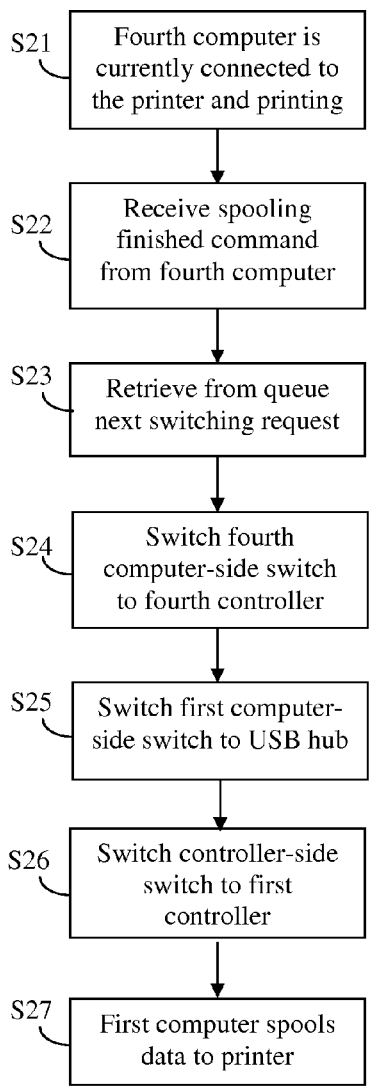
FIG. 2 illustrates the operation of the sharing switch device of the first embodiment using a particular example.

The operation of the sharing switch device 10 is described using a particular example with reference to FIG. 2. In this example, the fourth computer PC-4 is currently connected to the printer 30 and spooling print data to the printer (step S21). The computer PC-4 is referred to as the currently selected computer. In this state, the fourth computer-side switch SW-4 corresponding to the fourth computer PC-4 is switched to the USB hub 16. Data is communicated between the fourth computer PC-4 and the printer 30 via the fourth computer-side switch SW-4 and the USB hub 16. The other computer-side switches 12 (SW-1, SW-2 and SW-3) are switched to the corresponding controllers 14 (Contr-1, Contr-2 and Contr-3), respectively. The controller-side switch 18 is switched to the fourth controller Control-4 corresponding to the fourth computer PC-4. Thus, each computer 20 is connected to its corresponding controller 14, either via the corresponding computer-side switches 12 in the case of the non-selected computers PC-1, PC-2 and PC-3 or via the corresponding computer-side switches 12, the USB hub 16 and the controller-side switch 18 in the case of the currently selected computer PC4. As a result, each computer 20 can communicate commands with its corresponding controller 14.

When the fourth computer PC-4 finishes spooling print data, it transmits a "spooling finished" command to the corresponding controller Contr-4 via the fourth computer-side switch SW-4, the USB hub 16 and the controller-side switch 18 (step S22). The fourth controller Contr-4 communicates the spooling finished command to the master controller (assuming in this example the master controller is the first controller Contr-1). The master controller (Contr-1) maintains a queue of switching requests from the various computers 20. After receiving the spooling finished command from the fourth computer, the master controller retrieves the next switching request from the queue (step S23). If the queue is empty, the master controller waits to receive the next switching request from a computer and puts it in the queue. In this example, assume that the next switching request in the queue is a request from the first computer PC-1 (referred to as the next selected computer). The master controller and the slave controllers 14 (under the instruction of the master controller) perform appropriate control functions to switch the printer 30 from the currently selected computer PC-4 to the next selected computer PC-1.

Specifically, the fourth computer-side switch SW-4 is controlled to switch the fourth computer PC-4 to the fourth controller Contr-4 (i.e. it is no longer switched to the USB hub 16) (step S24). The first computer-side switch SW-1 is controlled to switch to the USB hub 16 (step S25). The controller-side switch 18 is controlled to switch to the first controller Contr-1 (i.e. the controller corresponding to the next selected computer) (step S25). The order of these switching steps S24 to S26 is not critical. The second and third computer-side switches SW-2 and SW-3 need not perform any action because their switching condition is unchanged.

After these switching operations, the next selected computer PC-1 is connected to the printer 30 via its corresponding computer-sided switch SW-1 and the USB hub 16. The next selected computer PC-1 is also connected to its corresponding controller Contr-1 via its corresponding computer-side switch SW-1, the USB hub 16 and the controller-side switch 18. The non-selected computers 20 (PC-2, PC-3 and PC-4) are connected to their corresponding controllers 14 (Contr-2, Contr-3 and Contr-4) via the corresponding computer-side switches 12 (SW-2, SW-3 and SW-4). The next selected computer PC-1 can now print to the printer 30 (step S27). When PC-1 finished printing, the process is repeated for the next switching request.

In the above example, the master controller is one of the USB device controllers 14. Alternatively, the master controller may be a separate controller (i.e. not one of the four USB device controllers 14), and the four USB device controllers 14 are slave controllers. Further, the four USB device controllers 14 may be implemented as one control circuit (such as an ASIC, FPGA, etc.) that includes the functionality of four USB device controllers. The actual implementation is not important, as long as there are four USB device controllers corresponding to the four computers PC-1 to PC-4.

Figure 3:
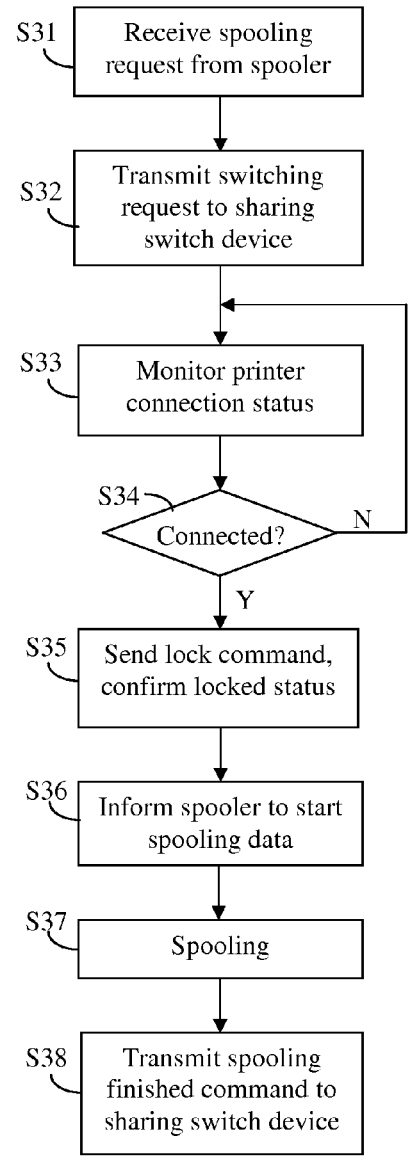
FIG. 3 illustrates a process performed by a program on a computer connected to the sharing switch device of FIG. 1.

FIG. 3 illustrates a process performed by the USB port monitor program 20A installed on the computer 20. Within the Windows printing architecture, the USB port monitor program 20A is located between the Spooler and the USB Driver Stack, both provided by Windows. For example, the USB port monitor 20A can replace the USB port monitor provided by Windows (Usbmon.dll).

As shown in FIG. 3, when the port monitor 20A receives a spooling request from the spooler (step S31), the port monitor transmits a switching request to the sharing switch device 10 (step S32). The switching request is transmitted automatically without requiring the user of the computer to issue a switching command. From the user's standpoint, only a print command is required. As mentioned earlier, the sharing switch device 10 maintains a queue of switching requests received from the computers 20, and automatically performs switching operations to switch the printer 30 from one computer 20 to another when appropriate. Thus, after transmitting the switching request, the port monitor 20A monitors the connection status of the sharing switch device 10 to determine whether the sharing switch device has connected the printer 30 to this particular computer (step S33). For example, the port monitor 20A may monitor the device occupied status of the computer, where an "occupied" status means the connection to the printer is established. The monitoring step continues ("N" in step S34) until the sharing switch device 10 connects this computer 20 to the printer 30 ("Y" in step S34).

If it is determined that the connection has been established ("Y" in step S34), the port monitor 20A sends a "lock" command to the sharing switch device 10, then confirms the switch locked status by receiving a response from sharing switch device (step S35). Step S35 is optional, because the sharing switch 10 may be designed so that it will automatically lock the connection after switching, and will unlock it only after a spooling finished command is received from the currently selected computer. Then, the port monitor 20A informs the spooler to start spooling data (step S36). The spooling process is carried out in a continuous manner (step S37). More specifically, the port monitor 20A receives print data from the spooler and transfers it to the printer 30 via the sharing switch device 10, and receives printer status information from the printer 30 via the sharing switch device 10 and transfers it to the spooler. After the spooling process is successfully completed, the port monitor 20A receives a notification from the spooler, and transmits a spooling finished command to the sharing switch device 10 (step S38).

As mentioned earlier, once the printer 30 is switched to a particular computer (the currently selected computer) 20, the sharing switch device 10 will not switch the printer to another computer unless a spooling finished command is received from the currently selected computer. After the switching steps S24 to S26 (see FIG. 2), if the sharing switch receives a lock command from the port monitor 20A (see step S35 in FIG. 3), it sends a lock confirmed signal back to the port monitor. Thus, spooling by the currently selected computer will not be interrupted. This ensures that spooling will be completed even when abnormal conditions occur at the printer (e.g., paper jam, paper tray empty, etc.).

As mentioned earlier, the computer 20 uses its default USB HID class device driver to interact with the controllers 14 of the sharing switch device 10. Thus, other than the port monitor 20A described above, the computer does not need to be loaded with other special programs.

Figure 4:
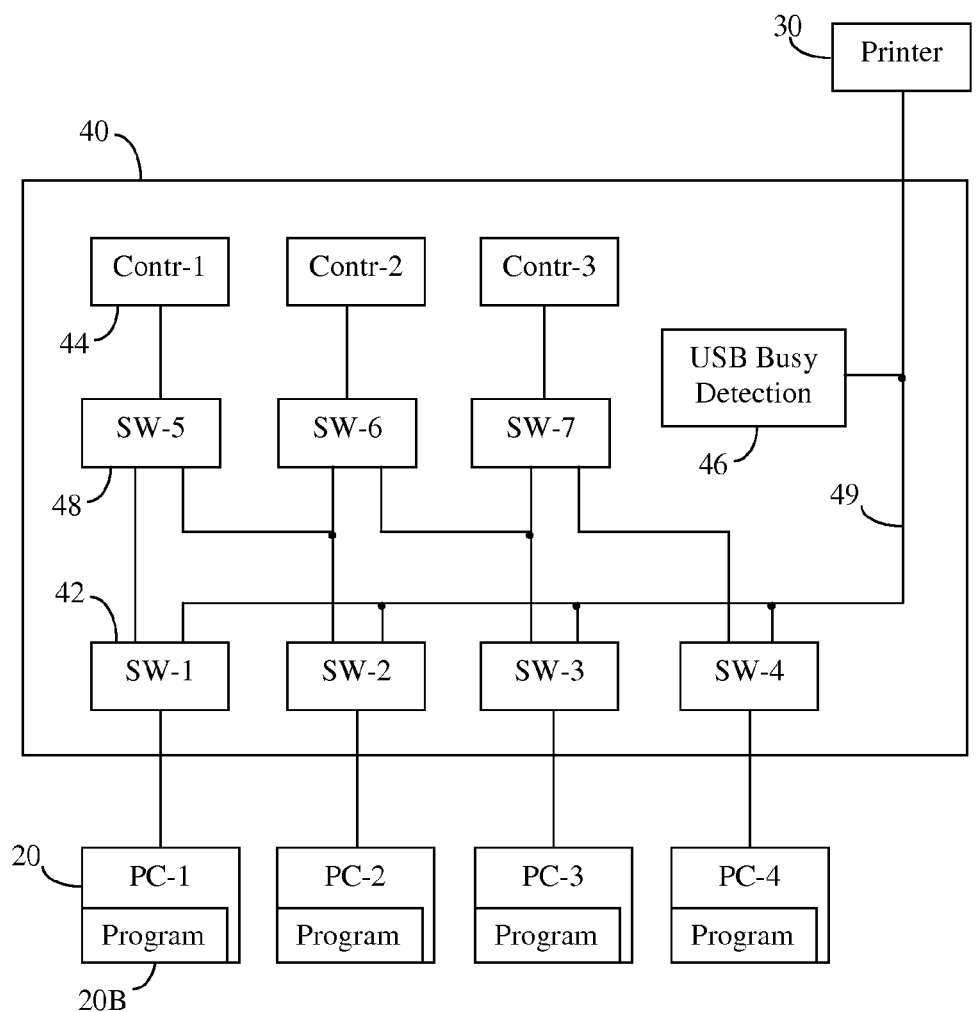
FIG. 4 is a block diagram of a system including a sharing switch device according to a second embodiment of the present invention.

FIG. 4 illustrates a sharing switch device according to a second embodiment of the present invention. As shown in FIG. 4, the sharing switch device 40 is coupled to a printer 30 and a plurality of computers 20 (four computers PC-1 to PC-4 are shown in this example). The sharing switch device 40 includes a plurality of computer-side switches 42 (SW-1 to SW-4 in this example) each coupled to a corresponding computer 20, and a plurality of USB device controllers 44. In the example shown in FIG. 4, three USB device controllers 44 (Contr-1 to Contr-3) are provided. In other words, the number of USB device controllers 44 is one fewer than the number (denoted "N") of computer-side switches 42. In the illustrated example, the three USB device controllers 44 are coupled by three corresponding controller-side switches 48 (SW-5 to SW-7) to the four computer-side switches 42 in a way such that the three controllers 44 can be switched to any three out of the four computer-side switches SW-1 to SW-4. Specifically, in the illustrated example, the first controller-side switch SW-5 switches the first controller Contro-1 to either the first computer-side switch SW-1 or the next computer-side switch SW-2, the second controller-side switch SW-6 switches the second controller Contro-2 to either the second computer-side switch SW-2 or the next computer-side switch SW-3, etc.

Each computer-side switch 42 is also coupled to the printer 30 via a common connection line 49, such that the computer-side switch 42 switches the corresponding computer 20 to either the printer 30 or one of the controller-side switched 48.

As in the first embodiment in FIG. 1, the USB device controllers 44 in FIG. 4 may be implemented as USB HID Class device controllers and the computers 20 may use their default HID drivers to interact with the controllers 44. The plurality of controllers 44 are connected together (connection lines not shown in FIG. 4) and communicate with each other using a master-slave model. The master controller and one or more slave controllers 44 control the switching operation of the computer-side switches 42 and the controller-side switches 48. Again, the desiccated control lines connecting the controllers 44 and the switches they control are not shown in FIG. 4 to avoid overcrowding.

The sharing switch device 40 also includes a USB busy detection circuit 46 coupled to the common connection line 49 between the computer-side switches 42 and the printer 30. The USB busy detection circuit 46 monitors the signals being transmitted on the connection line 49 to detect whether the line is busy, i.e., whether a computer 20 is currently spooling data to the printer 30. The USB busy detection circuit 46 transmits signals regarding the detection result to one of the controllers 44 (e.g. the master controller) over a control line (not shown in FIG. 4).

Each computer 20 is loaded with a special USB port monitor program 20B, which cooperates with the spooler service of the computer and with the sharing switch device 40 to accomplish spooling of print data to the shared printer 30, as will be described in more detail later.

Figure 5:
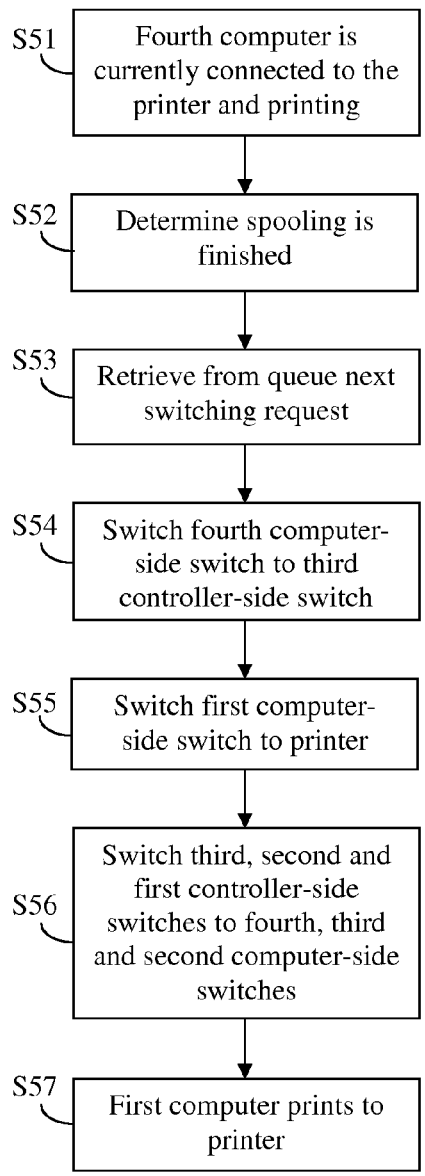
FIG. 5 illustrates the operation of the sharing switch device of the second embodiment using a particular example.

The operation of the sharing switch device 40 of FIG. 4 is described using a particular example with reference to FIG. 5. In this example, the fourth computer PC-4 is currently connected to the printer 30 and spooling data to the printer (it is referred to as the currently selected computer) (step S51). In this state, the fourth computer-side switch SW-4 corresponding to the fourth computer PC-4 is switched to the printer 30 via the common connection line 49. Data is communicated between the fourth computer PC-4 and the printer 30 via the fourth computer-side switch SW-4. The other three computer-side switches 12 (SW-1, SW-2 and SW-3) are switched to the three controller-side switches 48. The three controller-side switches 48 are switched such that each computer-side switches 48 for a non-selected computer is connected to a USB device controller 44. Specifically, in this example, the first controller-side switch SW-5 switches the first controller Contr-1 to the first computer-side switch SW-1, the second controller-side switch SW-6 switches the second controller Contr-2 to the second computer-side switch SW-2, and the third controller-side switch SW-7 switches the third controller Contr-3 to the third computer-side switch SW-3. As a result, the three non-selected computers 20 (PC-1, PC-2 and PC-3) are connected to the three controllers 44 (Contro-1, Contr-2 and Contr-3) and can communicate commands with the corresponding controllers 44.

When a computer is spooling data, the sharing switch device 40 continuously determines whether spooling has finished (step S52). In the embodiment of FIG. 4, the currently selected computer 20 (PC-4 in this example) is not connected to any USB device controller 44 when that computer is spooling data to the printer. Thus, the currently selected computer 20 is unable to send a spooling finished command to the sharing switch device 40. The function of determining whether spooling has finished is performed by the USB busy detection circuit 46 either alone or in cooperation with the master controller 44. To ensure that spooling is not interrupted prematurely, the sharing switch device 40 implements a delay mechanism so that a predetermined time period of inaction on the connection line 49 must be detected before the printer can be switched to another computer. In a preferred embodiment, the USB busy detection circuit 46 transmits busy or not-busy signals to the master controller 44; for example, it transmits a new signal every time the line condition changes from busy to not-busy or vice versa. Based on such signals, the master controller 44 uses its timer to monitor how long the line has been in the not-busy state, and determines that spooling has finished after a predetermined time period when the line has been not-busy. In an alternative embodiment, the USB busy detection circuit 46 has a timer and can determine how long the line has been not-busy, and transmits a spooling finished signal to the master controller 44 after a predetermined time period when the line has been not-busy.

The master controller 44 maintains a queue of switching requests from the various computers 20. After it is determined that spooling by the currently selected computer has finished, the master controller retrieves the next switching request from the queue (step S53). If the queue is empty, the master controller waits to receive the next switching request from a computer and puts it in the queue. In this example, assume that the next switching request in the queue is a request from the first computer PC-1 (referred to as the next selected computer). The master controller and the slave controllers 44 (under the instruction of the master controller) perform appropriate control functions to switch the printer 30 from the fourth computer PC-4 to the first computer PC-1.

Specifically, in this example, the fourth computer-side switch SW-4 is controlled to switch the fourth computer PC-4 to the third controller-side switch SW-7 (i.e. PC-4 is no longer switched to the printer 30) (step S54). The first computer-side switch SW-1 is controlled to switch the first computer PC-1 to the printer 30 (step S55). Further, the third controller-side switch SW-7 is controlled to switch to the fourth computer-side switch SW-4; the second controller-side switch SW-6 is controlled to switch to the third computer-side switch SW-3; and the first controller-side switch SW-5 is controlled to switch to the second computer-side switch SW-2 (step S56). The order of these switching steps S54 to S56 is not critical. The second and third computer-side switches SW-2 and SW-3 need not perform any action because their switching condition is unchanged.

After these switching operations, the next selected computer PC-1 is connected to the printer 30 via its corresponding computer-sided switch SW-1, and the non-selected computers 20 (PC-2, PC-3 and PC-4) are connected to the controllers 44 (Contr-2, Contr-3 and Contr-4) via the corresponding computer-side switches 42 (SW-2, SW-3 and SW-4) and the three controller-side switches 48. The next selected computer PC-1 can now print to the printer 30 (step S57). When PC-1 finished printing, the process is repeated for the next switching request.

The process performed by the port monitor program 20B loaded on the computers 20 in the second embodiment shown in FIG. 4 is similar to the process shown in FIG. 3 performed by the port monitor program 20A in the first embodiment shown in FIG. 1, with a number of differences as explained below. The first difference is that in step S33, the port monitor 20B determines the printer connection status by polling the HID (the controller 44) to determine if the HID connection is lost. The lost of the HID connection means the printer connection is established. The second difference is that the port monitor 20B does not perform step S35 (send lock command and confirm lock status). The third difference is that the port monitor 20B does not perform step S38 (transmit a spooling finished command to the USB sharing switch device). As mentioned earlier, the USB sharing switch device 40 uses a USB busy detection circuit to determine whether spooling by a computer is finished.

As mentioned earlier, once the printer 30 is switched to a particular computer (the currently selected computer) 20, the sharing switch device 40 will not switch the printer to another computer unless the USB busy detection circuit 46 or the master controller determines that spooling has finished. Thus, spooling by the currently selected computer will generally not be interrupted, although such interruption is not completely prevented.

Figure 6:
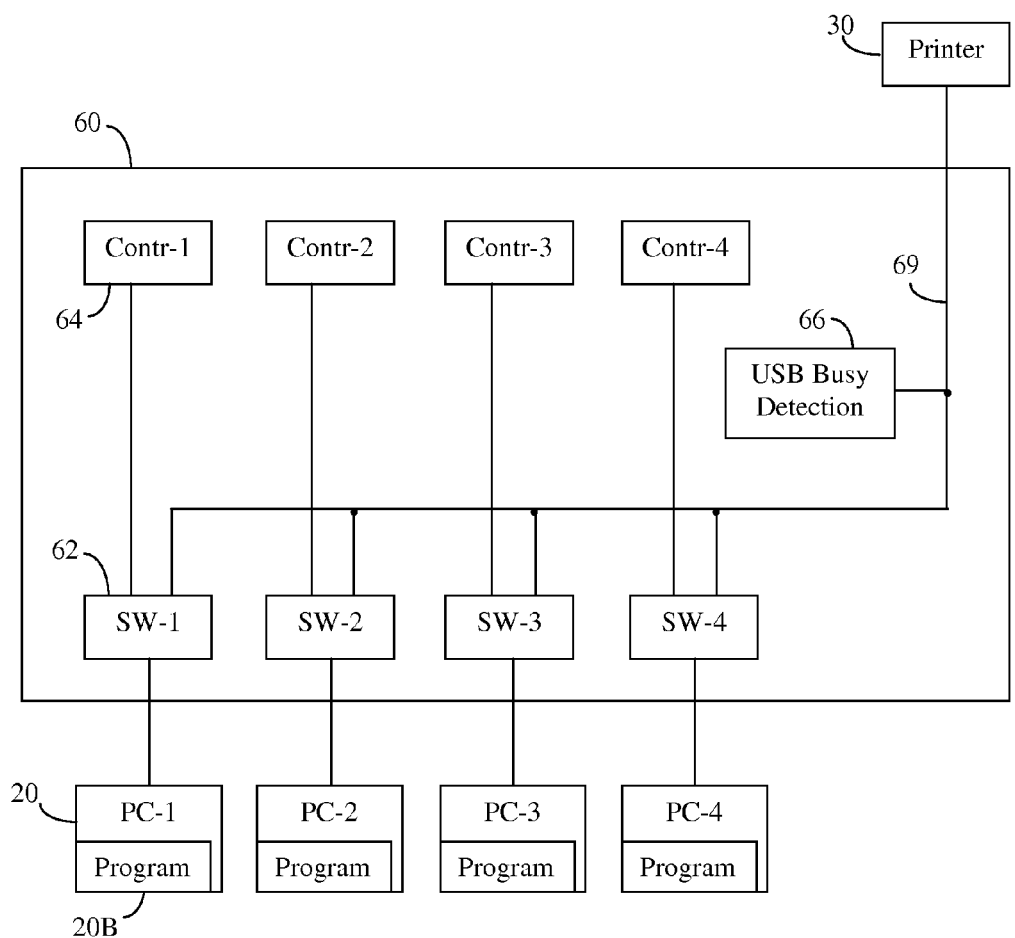
FIG. 6 is a block diagram of a system including a sharing switch device according to a third embodiment of the present invention.

In the sharing switch device 40 shown in FIG. 4, if a computer 20 is connected to the printer 30 by the corresponding computer-side switch 42, the computer is not connected to a controller 44. The number of controllers 44 can be one fewer than the number of computer-side switches 42, which reduces cost. The three controller-side switches 48 are provided so that regardless of which computer 20 is switched to the printer, the other three computer-side switches 42 can be connected to the three controllers 44. In a variation of the second embodiment, shown in FIG. 6, the sharing switch device 60 has the same number of controllers 64 as the number of computer-side switches 62 and computers 20; each controller 64 is directly connected to a corresponding computer-side switch 62, and the controller-side switches 48 in FIG. 4 are not necessary. In such an alternative structure, one controller 64 will not be performing any function when its corresponding computer 20 is connected to the printer 30. The operations of the USB busy detection circuit 66 and the master controller 64 in FIG. 6 are the same as the operations of the USB busy detection circuit 46 and the master controller 44 in the embodiment of FIG. 4. The switching operations of the computer-side switches 62 are similar to the switching operations of the computer-side switches 42 in FIG. 4. The same software 20B as in FIG. 4 can be used in the computers 20.

Figure 7:
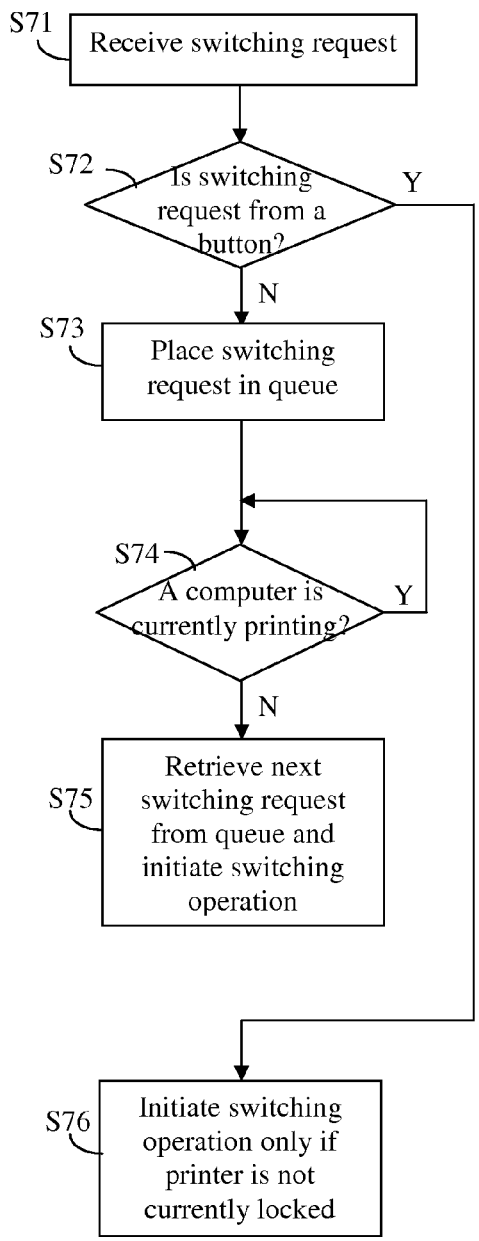
FIG. 7 illustrates a process performed by the master controller of the sharing switch device of FIGS. 1, 4 and 6.

FIG. 7 summarizes the communication and switching process of the master controller 14/44/64 of the sharing switch device 10/40/60. Although not shown in FIGS. 1, 4 and 6, one or more buttons may be optionally provided on a housing of the sharing switch device 10/40/60 to perform manual switching. When the master controller receives a switching request (step S71), it determines whether the switching request is received from the button on the sharing switch device 10/40/60 or from a computer 20 (step S72, optional). If the switching request is entered from a button, the sharing switch device 10/40/60 will initiate the switching operation only if the printer is not currently locked by another computer, otherwise the request is ignored (step S76). If the switching request is not received from the button ("N" in step S72), the switching request is placed in the queue (step S73). The master controller then monitors whether a computer is currently printing and determines whether printing is finished (step S74). As described earlier, this step is performed differently in the embodiment of FIG. 1 and the embodiments of FIGS. 4 and 6. When the printing is finished, the master controller retrieves the switching request at the front of the queue and initiates the switching operation to switch the next selected computer 20 to the printer 30 (step S75).

Using the sharing switch device described herein, the hardware/firmware of the sharing switch device and the software in the computers cooperate with each other to achieve fully automatic switching and printing. Once the USB port monitor program is installed on the computers, the user can print to the printer without performing any extra switching steps. The master controller of the sharing switch device implements a queue of switching requests, and can fulfill the switching requests on a first come, first served basis. In addition, using the embodiment of FIG. 1, the firmware of the sharing switch device can perform switching and lock functions without delay.

The printer 30 may be any type of printer, such as ink jet printer or laser printer.

Although the sharing switch devices in the above described embodiments use the USB protocol, other protocols such as IEEE 1394 may be used to interface with the computer and the printer, as long as the same protocol is used for the computer and the printer so that the sharing switch device does not need to transform the data format between the computer and the printer.

Although a printer is used in the above described embodiments as an example, the sharing switch devices may be used to share other peripheral devices such as mass storage devices, scanners, etc. Accordingly, references to "spooling" or "printing" in the above description can be replaced with a more general term "data transfer". For example, the "spooling finished" command can be broadly referred to as a "data transfer finished" command. In the case of these other types of peripheral devices, appropriate driver software in the computers may be modified to cooperate with the sharing switch device.

It will be apparent to those skilled in the art that various modification and variations can be made in the sharing switch device and method of the present invention without departing from the spirit or scope of the invention. Thus, it is intended that the present invention cover modifications and variations that come within the scope of the appended claims and their equivalents.

What is claimed is:

1. A sharing switch device for coupling to a peripheral device and a plurality of computers, comprising:

a plurality of computer-side switches each for coupling to a corresponding one and only one of the plurality of computers;

a hub device having an upstream end coupled to all of the plurality of computer-side switches, a first downstream end for coupling to the peripheral device, and a second downstream end;

a plurality of device controllers each being directly coupled to a corresponding one and only one of the plurality of computer-side switches, wherein each computer-side switch selectively couples the corresponding computer to either the corresponding device controller which is directly coupled to that computer-side switch, or the upstream end of the hub device, but not both; and a controller-side switch coupled to the plurality of device controllers and to the second downstream end of the hub device for selectively coupling the second downstream end of the hub device to one of the plurality of device controllers.

2. The sharing switch device of claim 1, wherein the device controllers are USB (Universal Serial Bus) device controllers, and wherein the hub device is a USB hub.

3. The sharing switch device of claim 2, wherein the device controllers are USB HID Class (Human Interface Device) device controllers.

4. The sharing switch device of claim 1, wherein the computer-side switches transfer data between the computers and the hub device without changing its format.

5. The sharing switch device of claim 1, wherein the device controllers control the switching of the computer-side switches and the controller-side switch to switch one of the computer-side switches corresponding to a selected one of the computers to the hub device, switch the other computer-side switches to their corresponding device controllers, and switch the controller-side switch to the device controller corresponding to the selected computer, whereby the selected computer is connected to the peripheral device via the corresponding computer-side switch and the hub device.

6. The sharing switch device of claim 1, wherein one of the device controllers is a master device controller and the other device controllers are slave device controllers controlled by the master device controller.

* * * * *